United States Patent
Mori et al.

(10) Patent No.: US 7,621,558 B2
(45) Date of Patent: Nov. 24, 2009

(54) FOLDING METHOD OF AIRBAG FOR REAR-END COLLISION AND AIRBAG DEVICE FOR REAR-END COLLISION

(75) Inventors: Kenji Mori, Aichi-ken (JP); Hiroyuki Kobayashi, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 11/902,207

(22) Filed: Sep. 20, 2007

(65) Prior Publication Data

US 2008/0018079 A1  Jan. 24, 2008

Related U.S. Application Data

(63) Continuation of application No. 10/844,582, filed on May 13, 2004, now Pat. No. 7,290,798.

(30) Foreign Application Priority Data

May 14, 2003 (JP) ............................. 2003-136535
May 16, 2003 (JP) ............................. 2003-139568

(51) Int. Cl.
  *B60R 21/213* (2006.01)
(52) U.S. Cl. ............... 280/730.1; 280/743.1; 280/728.2
(58) Field of Classification Search .............. 280/730.1, 280/743.1, 728.2, 730.2
  See application file for complete search history.

(56) References Cited

U.S. PATENT DOCUMENTS

| | | | | |
|---|---|---|---|---|
| 2,834,606 | A * | 5/1958 | Bertrand | ................. 280/730.1 |
| 6,364,349 | B1 * | 4/2002 | Kutchey et al. | .......... 280/730.2 |
| 6,877,771 | B2 | 4/2005 | Weber | |
| 6,945,562 | B2 | 9/2005 | Abe | |
| 7,055,851 | B2 | 6/2006 | Takimoto et al. | |
| 2002/0036395 | A1 * | 3/2002 | Bakhsh et al. | ........... 280/730.2 |
| 2002/0195803 | A1 * | 12/2002 | Terbu et al. | .............. 280/730.2 |
| 2003/0120409 | A1 | 6/2003 | Takimoto et al. | |

(Continued)

FOREIGN PATENT DOCUMENTS

DE  692 05 088  7/1992

(Continued)

OTHER PUBLICATIONS

Office Communication from the German Patent Office for corresponding application No. 10 2004 023 853.7-42 dated Mar. 10, 2005 (Translation enclosed).

(Continued)

*Primary Examiner*—Paul N Dickson
*Assistant Examiner*—Drew Brown
(74) *Attorney, Agent, or Firm*—Posz Law Group, PLC

(57) ABSTRACT

Both end portions in a second direction intersecting a first direction along which an airbag is deployed are folded to a center portion in the intersecting direction (first folding). The airbag is folded so that an upper side portion and a lower side portion are close to each other (second folding). The airbag has a bellows portion which is folded in a bellows shape between a connecting portion and a spiral portion. The airbag folded like this is enhanced in housing performance for the vehicle, and increases in stability of the deployment when the airbag is inflated and deployed.

7 Claims, 8 Drawing Sheets

U.S. PATENT DOCUMENTS

| | | |
|---|---|---|
| 2004/0066022 A1 | 4/2004 | Mori et al. |
| 2004/0239083 A1 | 12/2004 | Mori et al. |
| 2004/0245750 A1 | 12/2004 | Takimoto et al. |
| 2005/0062265 A1 | 3/2005 | Hotta et al. |
| 2006/0061075 A1* | 3/2006 | Aoki et al. ............... 280/730.2 |
| 2006/0082107 A1* | 4/2006 | Bakhsh et al. ........... 280/730.2 |

FOREIGN PATENT DOCUMENTS

| | | |
|---|---|---|
| DE | 696 23 795 | 10/1996 |
| DE | 697 29 441 | 2/1997 |
| DE | 697 20 762 | 12/1997 |
| DE | 698 22 599 | 9/1998 |
| EP | 0 523 704 | 7/1992 |
| EP | 0 855 975 | 10/1996 |
| EP | 0 880 446 | 2/1997 |
| EP | 0 941 178 | 12/1997 |
| EP | 0 940 301 | 9/1998 |
| EP | 0 980 796 | 8/1999 |
| JP | A-S49-38335 | 4/1974 |
| JP | U-S64-7054 | 1/1989 |
| JP | A-H03-276844 | 12/1991 |
| JP | A-H06-80057 | 3/1994 |
| JP | U-H06-65117 | 9/1994 |
| JP | A-H07-117605 | 5/1995 |
| JP | A-H07-186870 | 7/1995 |
| JP | A-H09-109825 | 4/1997 |
| JP | A-H09-175316 | 7/1997 |
| JP | A-H11-321538 | 11/1999 |
| JP | A-2001-505160 | 4/2001 |
| JP | A-2001-270413 | 10/2001 |
| JP | A-2001-287618 | 10/2001 |
| JP | A-2001-328503 | 11/2001 |
| JP | A-2002-211338 | 7/2002 |
| JP | A-2002-362284 | 12/2002 |
| JP | A-2003-40071 | 2/2003 |
| WO | WO 98/24661 | 6/1998 |
| WO | WO 02/04262 | 1/2002 |

OTHER PUBLICATIONS

Office Communication issued from Japanese Patent Office for a counterpart application No. 2003-139568 dated Dec. 19, 2006.

Office Communication mailed on Mar. 13, 2007 from Japanese Patent Office for Japanese counterpart application No. JP-A-2003-136535.

Office Action and its translation issued from Japanese Patent Office dated Jul. 6, 2007 for JP2003-136535.

* cited by examiner

FOLDING METHOD OF AIRBAG FOR REAR-END COLLISION AND AIRBAG DEVICE FOR REAR-END COLLISION

CROSS REFERENCE TO RELATED APPLICATIONS

This application is a continuation of application Ser. No. 10/844,582 filed on May 13, 2004, which is based upon and claims the benefit of Japanese Patent Application Nos. 2003-136535 filed on May 14, 2003 and 2003-139568 filed on May 16, 2003, the contents of which are incorporated herein by reference.

BACKGROUND OF THE INVENTION

The present invention relates to a folding method of an airbag for rear-end collision for protecting an occupant in a rear seat of a vehicle from impact applied to a rear portion of the vehicle, and an airbag apparatus for rear-end collisition including the airbag for a rear-end collision.

Japanese Laid-Open Patent Publication No. 2002-362284 discloses an airbag apparatus for rear-end collision. The airbag apparatus includes an elongated airbag folded like a bellows. The airbag is housed in a vehicle rear end portion between a roof panel of a vehicle and a-roof headlining, and is arranged parallel with a width direction of the vehicle.

At the time of actuation of the airbag apparatus, the airbag is inflated and deployed behind a rearmost seat of the vehicle. When inflated and deployed, the airbag forms an approximately trapezoidal shape gradually extending from an upper side to a lower side with respect to a width direction of the vehicle.

Generally, a rear part of a passenger compartment becomes larger from a roof of the vehicle toward a lower portion with respect to a width direction of the vehicle. In the case of the airbag of the above-described Publication, the width in a longitudinal direction of the folded airbag is larger than the width of the rear part of the passenger compartment with respect to the width direction of the vehicle, and therefore it is difficult to house the airbag in the vehicle.

When the airbag is inflated and developed, an end portion of the airbag sometimes is deployed while being swung in a direction to intersect a deployment direction of the airbag, and therefore a deployment of the airbag is not stable.

SUMMARY OF THE INVENTION

Accordingly, it is an objective of the present invention to provide a folding method of an airbag for rear-end collision that is easy to accommodate into a vehicle and is deployed in a stable manner, and an airbag apparatus for rear-end collision capable of effectively protecting an occupant of a vehicle.

To achieve the foregoing and other objectives and in accordance with the purpose of the present invention, a method for folding an airbag that is inflated and deployed at a position rearward of a rearmost seat of a vehicle to protect an occupant seated on the rearmost seat. The airbag has a supply port through which gas is supplied and is accommodated in the interior of the vehicle while being folded in a state extending along a width direction of the vehicle. When gas is supplied through the supply port to the airbag in the folded state, the air bag is deployed in a predetermined first direction. The method includes first folding in which first end portions of the airbag in a second direction that intersects the first direction are folded toward a center of the airbag with respect to the second direction; and second folding in which, after the first folding, the airbag is folded such that second end portions of the airbag in the first direction approach each other.

The present invention provides another method for folding an airbag that is inflated and deployed at a position rearward of a rearmost seat of a vehicle to protect an occupant seated on the rearmost seat. The airbag has a supply port through which gas is supplied and is accommodated in the interior of the vehicle while being folded in a state extending along a width direction of the vehicle. When gas is supplied through the supply port to the airbag in the folded state, the air bag is deployed in a predetermined first direction. The method includes first folding in which the airbag is folded such that first end portions of the airbag approach each other with respect to the first direction; and second folding in which, after the first folding, second end portions of the airbag in a second direction that intersects the first direction are folded toward a center of the airbag with respect to the second direction.

The present invention also provides another method for folding an airbag that is inflated and deployed at a position rearward of a rearmost seat of a vehicle to protect an occupant seated on the rearmost seat. The airbag has a supply port through which gas is supplied and is accommodated in the interior of the vehicle while being folded in a state extending along a width direction of the vehicle. The airbag includes a first surface and a second surface. When the airbag is deployed, the first surface faces the seat and the second surface is located at a side opposite from the first side, the method includes folding the airbag in a spiral form onto the second surface.

The present invention also provides an airbag apparatus for an occupant seated in a rearmost seat of a vehicle. The airbag apparatus has an airbag and an inflator. The airbag is accommodated in the interior of the vehicle while being folded in a state extending along a width direction of the vehicle. The airbag has a supply port through which gas is supplied. The inflator supplies gas to the airbag through the supply port, thereby inflating and deploying the airbag. When gas is supplied through the supply port to the airbag in the folded state, the air bag is deployed in a predetermined first direction. In the accommodated state, the airbag is folded such that first end portions of the airbag in the first direction approach each other, and second end portions of the airbag in a second direction that intersects the first direction are folded toward a center of the airbag with respect to the second direction.

The present invention also provides another air bag apparatus for an occupant seated in a rearmost seat of a vehicle. The airbag apparatus has an airbag and an inflator. The airbag is accommodated in the interior of the vehicle while being folded in a state extending along a width direction of the vehicle. The airbag has a supply port through which gas is supplied. The inflator supplies gas to the airbag through the supply port, thereby inflating and deploying the airbag. The airbag includes a first surface and a second surface. When the airbag is deployed, the first surface faces the seat and the second surface is located at a side opposite from the first side. In the accommodated state, the airbag is folded in a spiral form onto the second surface.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention will now be described with reference to FIGS. 1 to 7.

Figure 1:
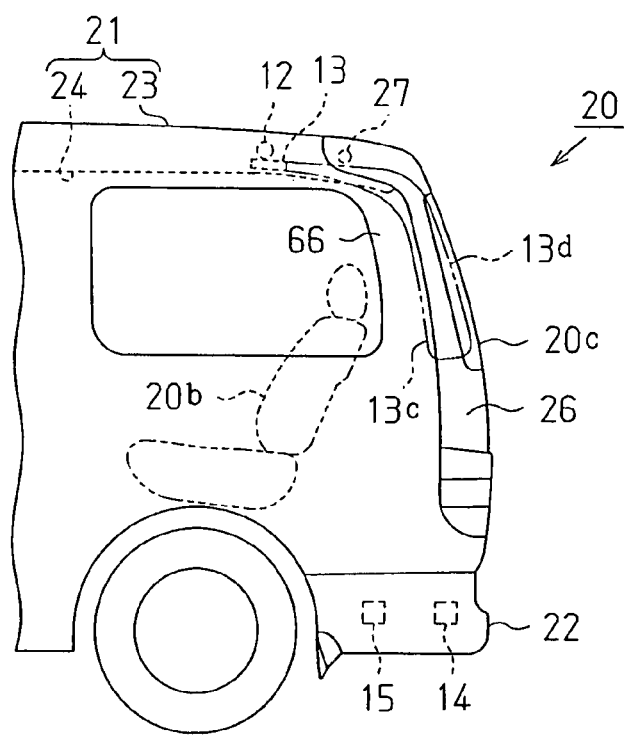
FIG. 1 is a side view of a rear part of a vehicle according to a first embodiment of the present invention.
Figure 2:
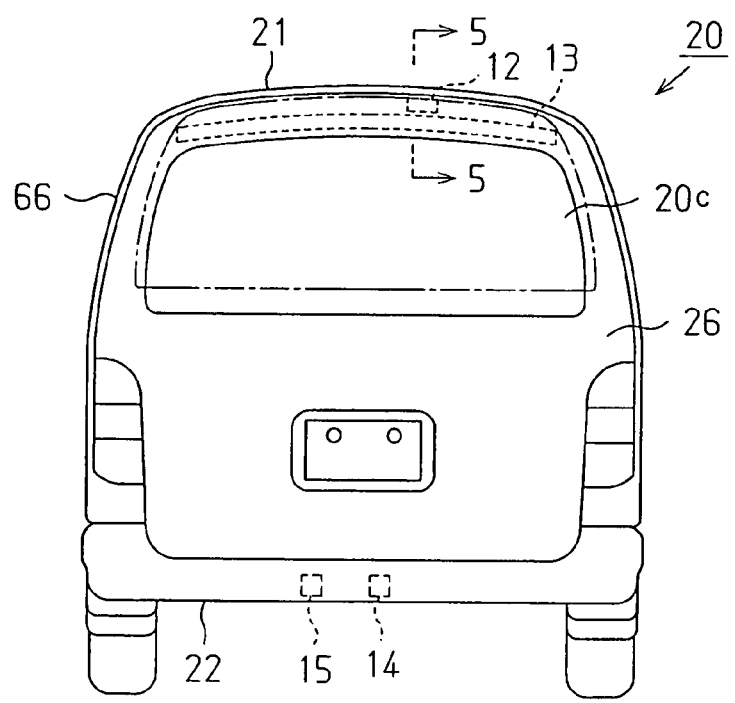
FIG. 2 is a rear view illustrating the vehicle shown in FIG. 1.

As shown in FIGS. 1 and 2, the airbag apparatus for rear-end collision includes an inflator 12 for producing gas, an airbag 13 as an airbag for rear-end collision, and an impact sensor 14. The impact sensors 14 sends out detection signals when an impact that is equal to or greater than a predetermined value is applied to the vehicle 20 from the rear of the vehicle 20. In this embodiment, the vehicle 20 is a minivan. The vehicle 20 may be a hatchback.

The airbag 13 folded in a predetermined shape and the inflator 12 for supplying gas for inflation to the airbag 13 are provided at an end portion of a roof 21 located at a rear side of the vehicle 20, namely, at a rear end portion of the roof 21. The inflator 12 is coupled to the airbag 13 with, for example, a gas supply pipe of aluminum. The impact sensor 14 is mounted on a rear-end portion of the vehicle 20 (for example, a rear bumper 22).

The airbag apparatus for rear-end collision includes a control device 15 constructed by, for example, a microcomputer. The inflator 12 and the impact sensor 14 are electrically connected to the control device 15. The control device 15 determines that an impact is applied to the vehicle 20 based on the output signal from the impact sensor 14, and sends out an actuation signal to the inflator 12.

The airbag 13 will hereinafter described in detail.

Figure 3:
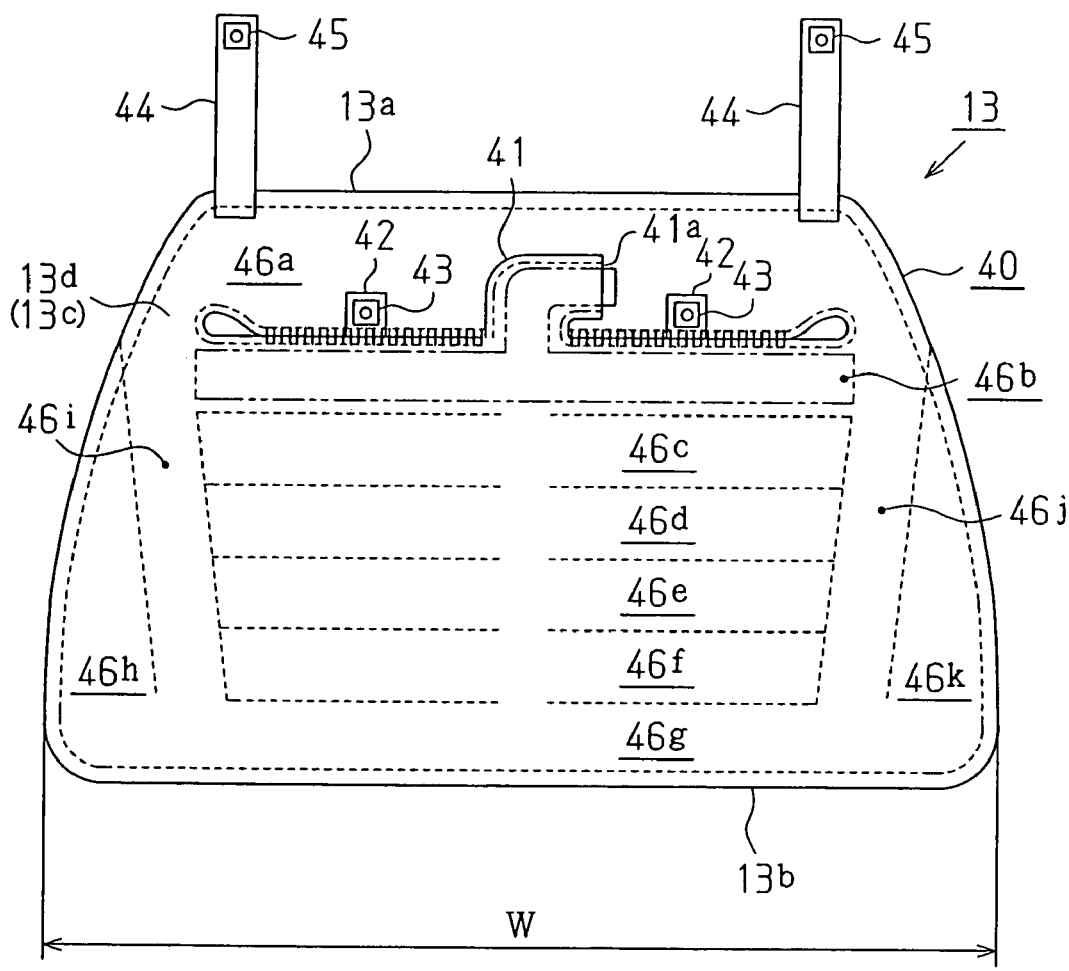
FIG. 3 is a front view showing an airbag.

As shown in FIG. 3, the airbag 13 is constructed by a fabric sheet 40 woven in a bag shape. When the fabric sheet 40 is unfolded in a plane, the airbag 13 forms an approximately trapezoidal shape. Specifically, a width W of the airbag 13 becomes larger from an upper side 13a located at an upper side of the vehicle when the airbag 13 is inflated and developed toward a lower side 13b. The airbag 13 has a first surface 13c opposed to a rear seat 20b (see FIG. 1) disposed at the rearmost side of the vehicle in the passenger compartment 20a, and a second surface 13d located at an opposite side of the first surface 13c and opposed to a rear window glass 20c of the vehicle 20 in the inflated and deployed state.

The airbag 13 includes a connecting portion 41 having a supply port 41a. The inflator 12 is connected to the supply port 41a via the gas supply pipe.

A pair of mounting pieces 42 to be attached to the roof 21 of the vehicle 20 are formed at the airbag 13. Each mounting piece 42 is integrally formed with the fabric sheet 40. Fixing metal fittings 43 are attached to each of the mounting pieces 42. Through holes (not shown) are formed in the metal fittings 43 and the mounting pieces 42.

A pair of mounting belts 44 to be attached to the roof 21 of the vehicle 20 are provided in the vicinity of the upper side 13a of the airbag 13 and at both end portions in the width direction of the airbag 13. A proximal end of each mounting belt 44 is sewed to the fabric sheet 40. A fixing metal fitting 45 is attached to a distal end of each mounting belts 33. Through holes (not shown) are formed in the metal fittings 45 and the mounting belts 44.

The airbag 13 is provided with a plurality of (eleven in this embodiment) cells, that is, a first cell 46a to an eleventh cell 46k which are divisions made by sewing the fabric sheet 40 and each inflated in a cylindrical shape when gas is supplied. Among these cells 46a to 46k, the first cell 46a to a seventh cell 46g are disposed to extend approximately parallel to the width direction of the vehicle. An eighth cell 46h to the eleventh cell 46k are disposed to extend in a height direction of the vehicle at both end portions in the width direction of the airbag 13. The cells 46a to 46k communicate with each other by partially omitting sewing of the fabric sheet 40.

The first cell 46a and a second cell 46b communicate with a ninth cell 46i and a tenth cell 46j at their both end portions. The second cell 46b to the seventh cell 46g communicate with each other in approximately central portion in the width direction of the airbag 13. The seventh cell 46g communicates with the eighth cell 46h to the eleventh cell 46k at its both end portions. The eighth cell 46h communicates with the ninth cell 46i, and the tenth cell 46j communicates with the eleventh cell 46k respectively in the vicinity of the lower side 13b of the airbag 13. The connecting portion 41 communicates with the second cell 46b in an approximately central portion in the width direction of the airbag 13.

The folding method of the airbag 13 will now be described.

Figure 4A:
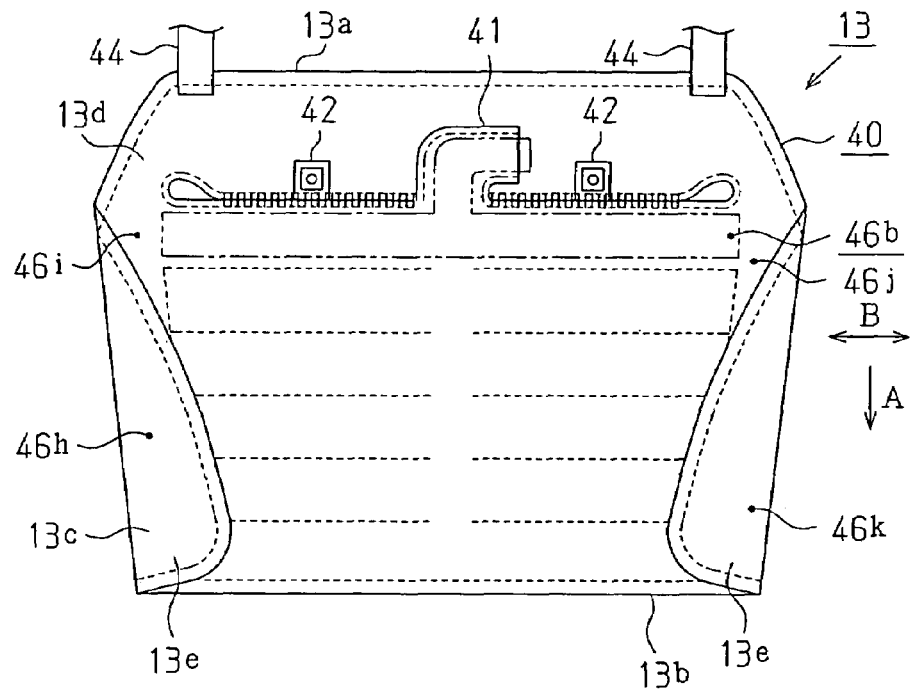
FIGS. 4(a) to 4(c) are explanatory views for explaining folding process of the airbag.

In FIG. 4(a), a direction represented by the arrow A is referred to as a first direction, and a direction represented by the arrow B is referred to as a first direction. The airbag 13 is deployed along the first direction. The second direction intersects the first direction. As shown in FIG. 4(a), both end portions 13e of the airbag 13 in the second direction are folded toward a center in the second direction (first folding). In this first folding, the end portions 13e are folded along the sewn threads between the eighth cell 46h and the ninth cell 46i, and between the tenth cell 46j and the eleventh cell 46k. In the first folding, both end portions 13e are folded to the side of the second surface 13d opposed to the rear window glass 20c in the deployed state (see FIG. 1).

Figure 4B:
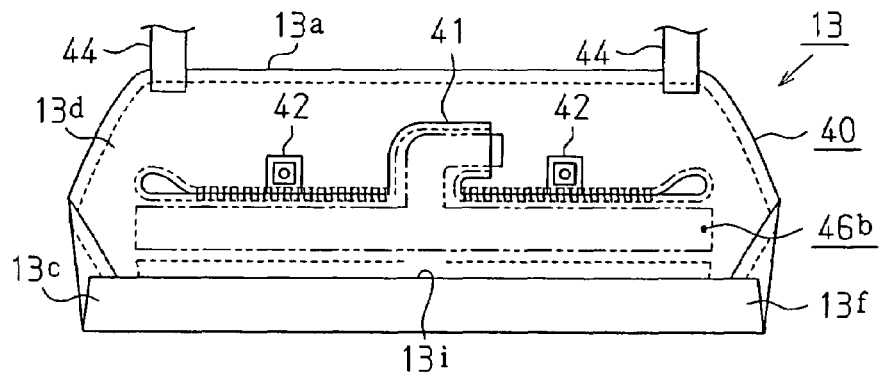

Next, as shown in FIG. 4(b), the airbag 13 is folded so that the upper side 13a and the lower side 13b are close to each other (second folding). In the second folding, the airbag 13 is folded in a spiral shape with the lower side 13b turned toward the upper side 13a up to the position in which the distance between the connecting portion 41 and the folding end surface 13i becomes a predetermined distance. In this case, the folded first surface 13c of the airbag 13 faces the rear window glass 20c. A spiral portion 13f is formed in the airbag 13 at a position spaced a predetermined distance from the connecting portion 41 by the second folding.

Figure 4C:
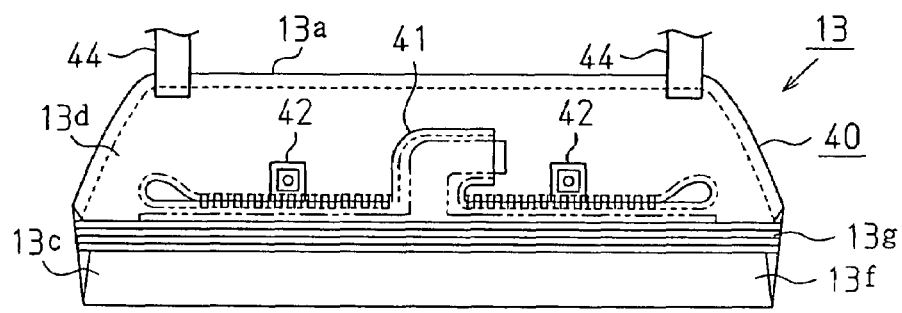

Subsequently, as shown in FIG. 4(c), the airbag 13 is folded to be shaped like a bellows between the connecting portion 41 and the spiral portion 13f to form a bellows portion 13g. In this manner, the airbag 13 is folded.

A description will be given to the structure of a rear end of the roof 21 to which the airbag 13 is attached.

Figure 5:
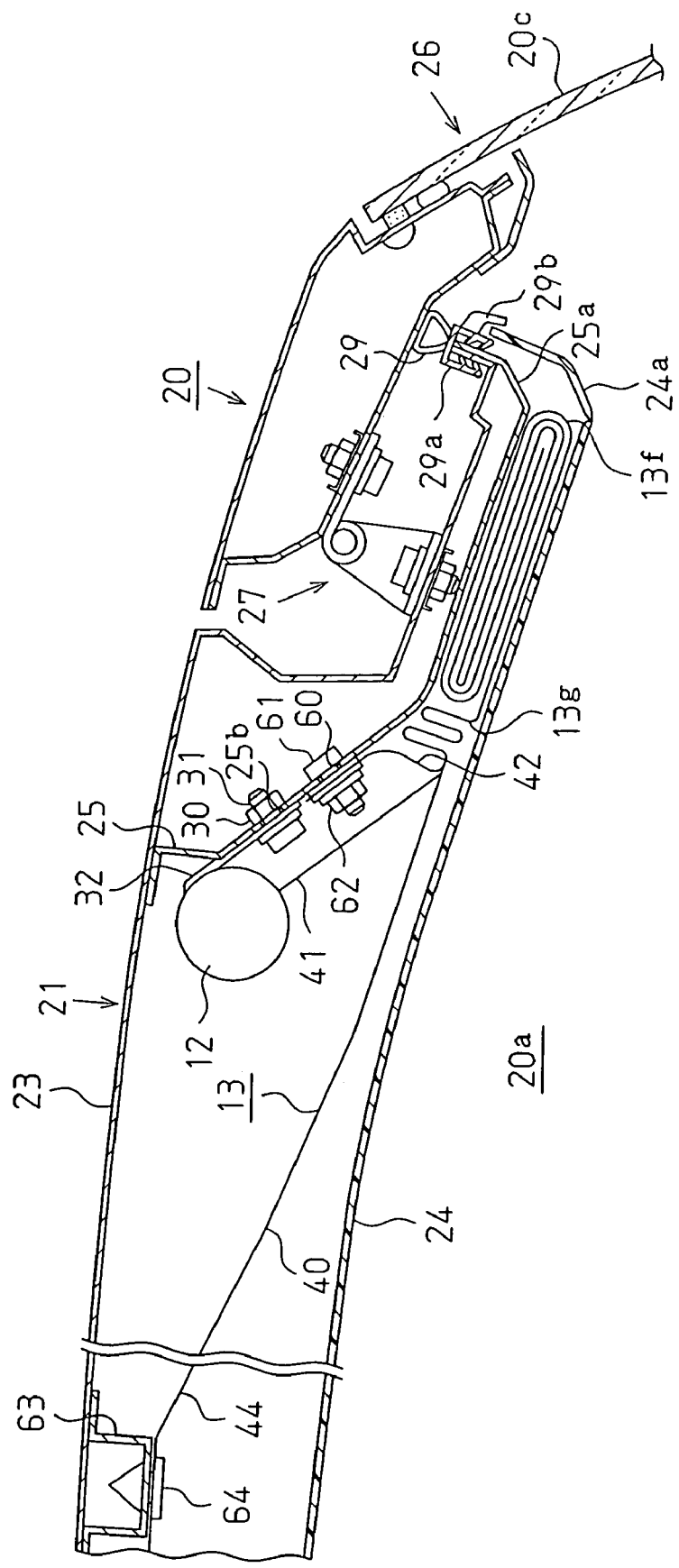
FIG. 5 is a cross-sectional view taken along line 5-5 of FIG. 2.

As shown in FIG. 5, the roof 21 of the vehicle 20 includes a roof panel 23 as an exterior member, a roof headlining 24 as an ornamental member, and an inner panel 25. The roof headlining 24 is formed of flexible material, such as synthetic resin. The roof headlining 24 covers the entire inner surface of the roof panel 23 located on the side of a passenger compartment 20a. The inner panel 25 is located between the roof panel 23 and the roof headlining 24. The inner panel 25 forms a hollow rear roof rail 25a with the roof panel 23. A rear door 26 is attached to the rear end of the roof panel 23 with a hinge mechanism 27 to be selectively opened and closed. A rear window glass 20c is attached to the rear door 26.

A rear end portion 24a of the roof headlining 24 is covered with a cover piece 29b projecting from a base portion 29a of a weather strip 29 for sealing attached to a rear end portion of the inner panel 25. When the airbag 13 is inflated and developed, the roof headlining 24 deforms to separate downward from the inner panel 25 to form a space of a predetermined volume between the roof headlining 24 and the inner panel 25 (see FIG. 6).

A plurality of (only one is shown in FIG. 5) mounting holes 25b are formed in a front end portion of the inner panel 25 at a rear side of the vehicle 20. Mounting nuts 30 are welded onto the inner panel 25 so as to correspond to these mounting holes 25b. A rear roof rail 25a has high rigidity so that deformation when an impact is applied to the vehicle 20 from the rear becomes comparatively small.

A bracket 32 is attached to the inner panel 25 using the mounting bolt 31 screwed into the mounting nut 30 from the mounting hole 25b. The inflator 12 is fixed to the inner panel 25 through the bracket 32 and the mounting nut 30.

A fixing structure of the airbag 13 will now be described.

As shown in FIG. 5, an insertion hole 60 is formed in the inner panel 25 at a position corresponding to the mounting piece 42 of the airbag 13 at the front end portion of the inner panel 25. A fixing bolt 61 inserted into the insertion hole 60 toward the passenger compartment 20a from an inner portion of the rear roof rail 25a is welded onto the insertion hole 60. With the fixing bolt 61 inserted into the through hole of the mounting piece 42 of the airbag 13, the fixing nut 62 is screwed onto the fixing bolt 61. Thereby, the airbag 13 is fixed to the inner panel 25 via the mounting piece 42.

A roof bow 63 extending in the width direction of the vehicle 20 at the front side of the vehicle 20 from the inner panel 25 is fixed at a surface of the roof panel 23 facing the passenger compartment 20a. The roof bow 63 has a pair of mounting holes (not shown) corresponding to both the mounting belts 44 of the airbag 13. A clip 64 is engaged into the mounting hole in the state in which the clip 64 penetrates through the through hole of the mounting belt 44, and thereby the airbag 13 is fixed to the roof bow 63.

The airbag 13 is thus fixed to the inner panel 25 and the roof bow 63. In this state, a portion in the airbag 13 near the upper side 13a from both the mounting pieces 42, namely, the portion corresponding to the first cell 46a is housed between the roof panel 23 and the roof headlining 24 in the state in which it is deployed to form an approximately plane shape. A portion in the airbag 13 near the lower side 13b from both the mounting pieces 42 is housed between the roof panel 23 and the roof headlining 24 in the state in which the bellows portion 13g and the spiral portion 13f is folded to continue in the deployment direction at the time of inflation of the airbag 13, namely, in the direction toward the rear door 26. In this manner, the airbag 13 is housed between the roof panel 23 and the roof headlining 24 to extend in the width direction of the vehicle 20.

Next, an actuation of the airbag apparatus for rear-end collision will be explained hereinafter.

When the impact of a predetermined value or more is applied to the vehicle 20 from the rear, an output signal from the impact sensor 14 is inputted into the control device 15, and in response to this, the control device 15 outputs an actuation signal to the inflator 12. As a result, gas is generated in the inflator 12, and gas is introduced into the airbag 13 via the gas supply pipe and the connecting portion 41.

Figure 6:
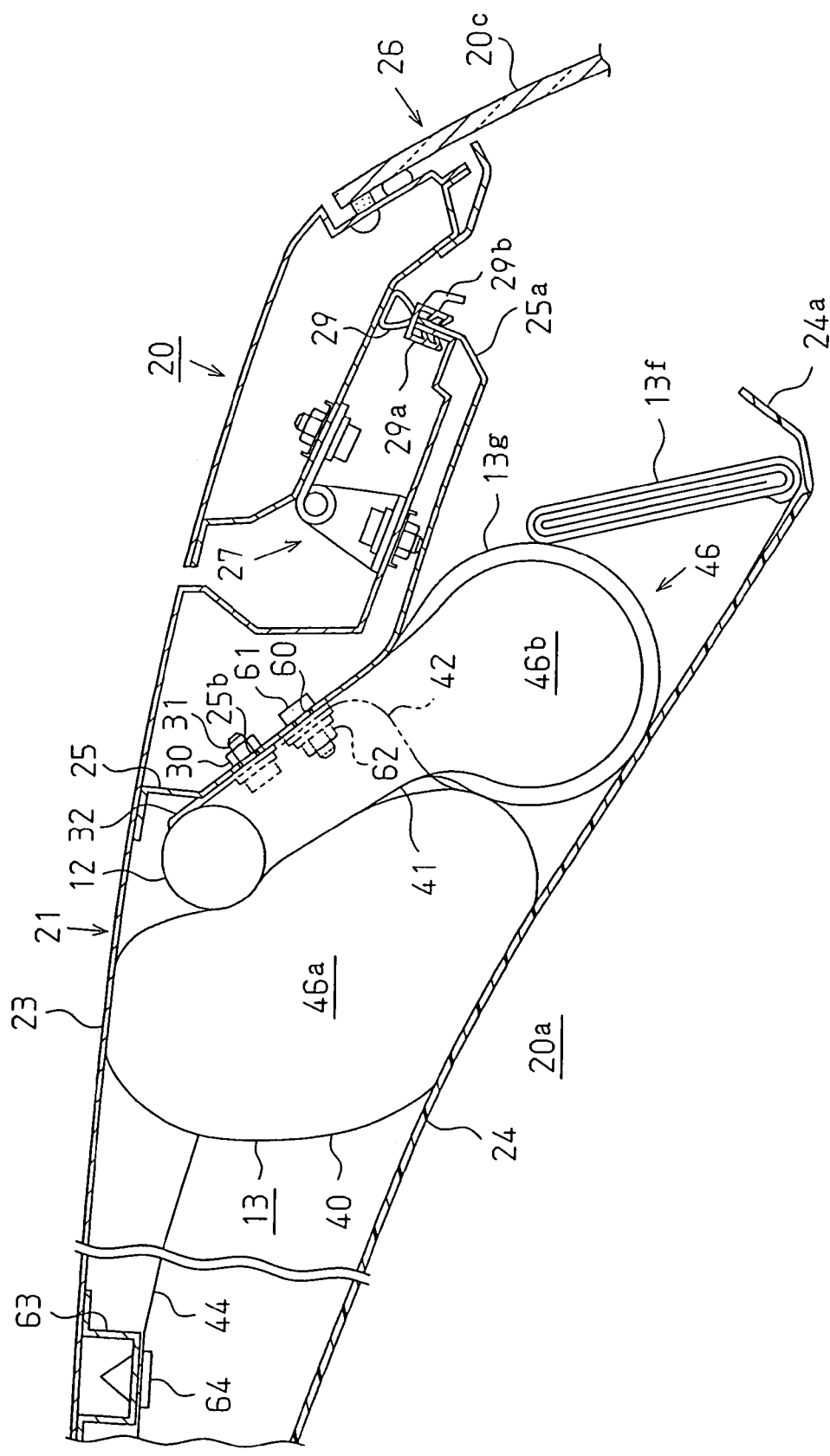
FIG. 6 is a cross-sectional view of the rear part of the vehicle showing the airbag at an initial stage of inflation and deployment.

When gas from the inflator 12 is supplied into the airbag 13, the pressure in the bellows portion 13g (the second cell 46b) and the first cell 46a is quickly raised to expand the bellows portion 13g and the first cell 46a first, as shown in FIG. 6. The inflated bellows portion 13g and the first cell 46a presses the roof headlining 24 downward. By this pressing, the portion of the roof headlining 24 at the side of the rear of the vehicle is entirely displaced downward, and the rear end portion 24a of the roof headlining 24 is separated from the cover piece 29b. As a result, an opening directed to the rear window glass 20c is formed between the roof headlining 24 and the inner panel 25.

Figure 7:
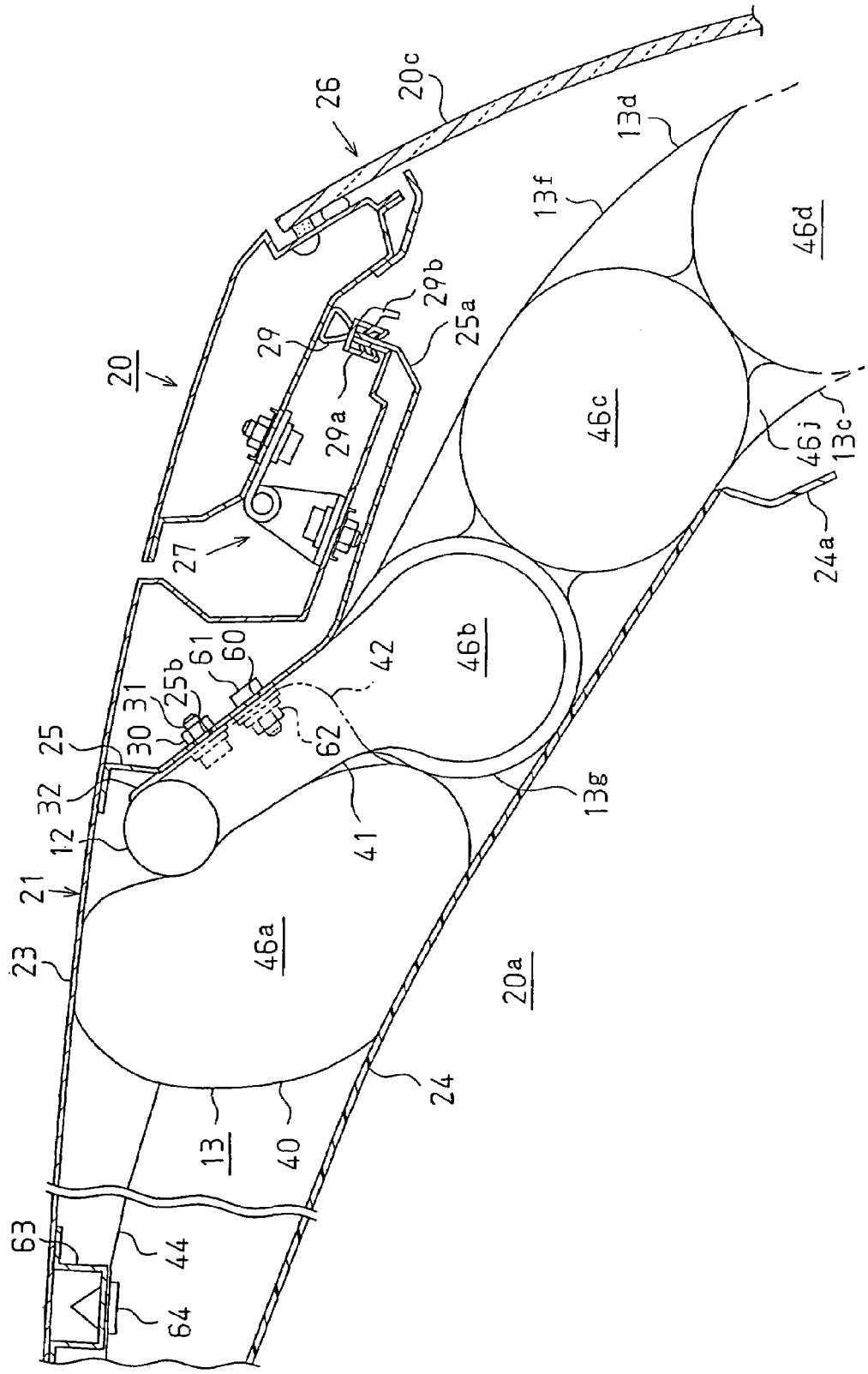
FIG. 7 is a cross-sectional view of the rear part of the vehicle showing the airbag at a final stage of inflation and deployment.

When gas is successively supplied into the airbag 13 from the inflator 12, in the airbag 13, the spiral portion 13f is inflated and developed along the rear window glass 20c, as shown in FIG. 7. On this occasion, each end portion 13e of the airbag 13 is inflated and developed in the width direction of the vehicle 20 while displacing to draw an approximately semicircle to the rear side of the vehicle from the folded state to the center in the deployment direction.

As a result, the airbag 13 is deployed to divide the rear seat 20b and the rear window glass 20c in the passenger compartment 20a. An occupant seated on the rear seat 20b and the rear window glass 20c are separated via the airbag 13. Accordingly, not only the impact applied to the rear of the vehicle 20 is absorbed by the airbag 13 inflated and deployed, but also the influence of the scattered things, entering things and the like from the rear on the inside of the passenger compartment 20a is reduced.

The portion near the upper side 13a from the mounting piece 42 in the airbag 13, namely, the first cell 46a is inflated between the roof panel 23 and the roof headlining 24. As a result, a thick cushion is also formed between the roof panel 23 and the roof headlining 24 by the first cell 46a. As a result, protecting performance for an occupant seated on the rear seat 20b is enhanced.

This embodiment provides the following advantages.

(1) After the first folding in which both the end portions 13e in the second direction intersecting the first direction along which the airbag 13 deploys are folded to the center portion in the second direction, the second folding is performed so that the lower side portion 13b approaches the upper side portion 13a. By performing the first folding and the second folding, the width of the airbag 13 in the second direction is made shorter than the width in the sate in which the airbag is inflated in the plane shape in the same direction. As a result, the housing performance when the folded airbag 13 is housed in the space between the roof panel 23 and the roof headlining 24 of the vehicle 20 is enhanced.

(2) On the occasion of the first folding of the airbag 13, the both end portions 13e of the airbag 13 are folded to the side of the second surface 13d. As a result, when the airbag 13 is inflated and deployed, the both end portions 13e are deployed in the width direction of the vehicle 20 while displacing to draw the approximately semicircle at the vehicle rear side along the rear window glass 20c from the folded state to the center in the first direction. As a result, the both end portions 13e hardly interfere with the head rest and the like of the rear seat 20b in the developing process. As a result, each end portion 13e of the airbag 13 is quickly deployed to a predetermined deployed position, and protecting performance for an occupant seated on the rear seat 20b is enhanced.

(3) On the occasion of the second folding of the airbag 13, the part of the airbag 13 corresponding to the connecting portion 41 and the lower side portion 13b is folded in the spiral form onto the second surface 13d. As a result, when the gas supplied into the airbag 13 enters the inside of the spiral portion 13f of the airbag 13, the force developing toward the rear (rear window glass 20c) of the vehicle 20 occurs in the airbag 13. By this force, the airbag 13 is deployed along the rear window glass 20c. As a result, stability of the deployment of the airbag 13 is increased, and stability of the protection area for an occupant seated on the rear seat 20b is increased.

(4) The bellows portion 13g is provided between the connecting portion 41 and the spiral portion 13f of the airbag 13. As a result, the resistance of the airbag 13 in the vicinity of the connecting portion 41 is reduced when the airbag 13 is deployed as compared with the case where the entire airbag 13 from the supply port 41a (connecting portion 41) to the lower side 13b is folded in the spiral form, for example. As a result, the bellows portion 13g of the airbag 13 is quickly inflated, and an opening is formed at the vehicle rear portion between the roof panel 23 and the roof headlining 24 at the early stage. As a result, the airbag 13 is deployed at the early stage.

A second embodiment of the present invention will now be described with reference to FIGS. 8 and 9. The differences from the embodiment shown in FIGS. 1 to 7 will mainly be discussed. In this embodiment, the folding method of the airbag 13 differs from the embodiment shown in FIGS. 1 to 7.

Figure 8:
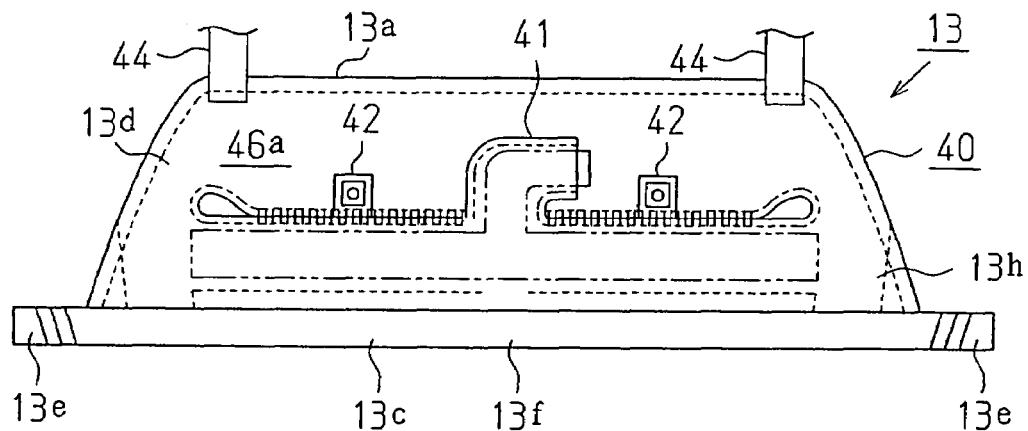
FIG. 8 is an explanatory view for explaining folding of an airbag according to a second embodiment of the present invention.

The airbag 13 is folded so that the upper side 13a and the lower side 13b are close to each other as shown in FIG. 8 in the state in which the fabric sheet 40 is unfolded in the plane shape (the state shown in FIG. 3). Specifically, the airbag 13 is folded toward the upper side 13a from the lower side 13b in the spiral shape up to the position where the connecting portion 41 and the lower side 13b are spaced by a predetermined distance. On this occasion, the airbag 13 is folded in the spiral shape from the lower side 13b of the airbag 13 to the side of the second surface 13d. As a result, the spiral portion 13f is formed in the airbag 13 at a position spaced from the connecting portion 41 by a predetermined distance to the side of the first direction (the direction toward the lower side 13b).

In this embodiment, the part corresponding to the part of the airbag 13 between the connecting portion 41 and the spiral portion 13f is a non-folded portion 13h housed in the vehicle 20 in the deployed state.

Figure 9:
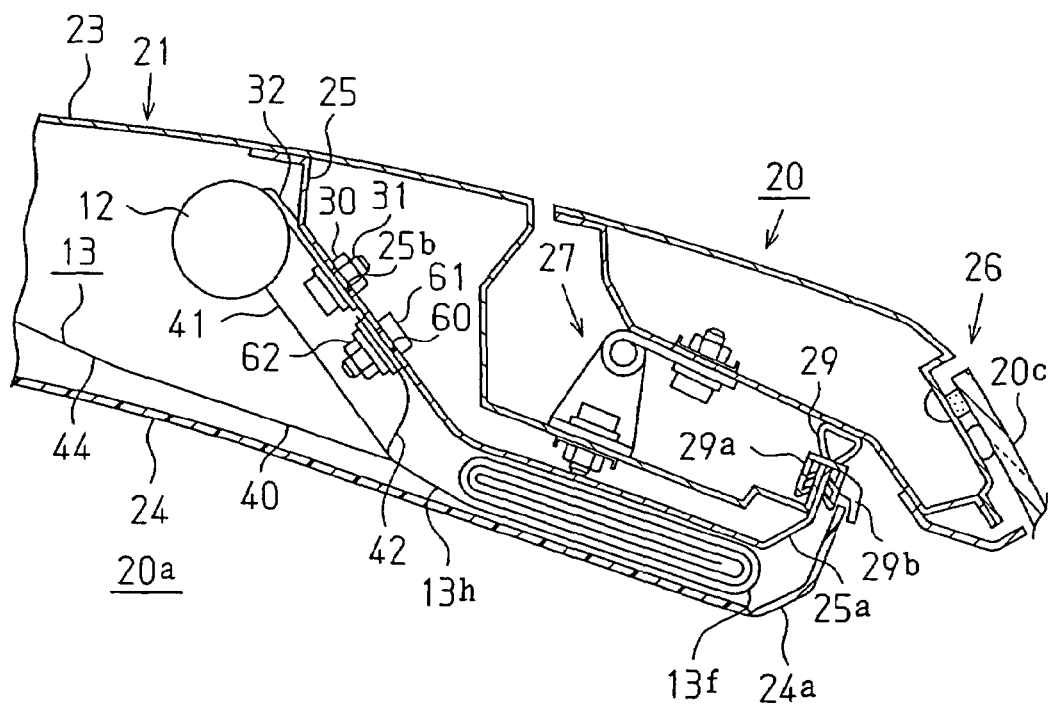
FIG. 9 is a cross-sectional view showing the rear part of the vehicle in which an airbag is housed.

The airbag 13 folded is contained in a space between the roof panel 23 and the roof headlining 24 as shown in FIG. 9.

Namely, as shown in FIG. 9, the portion in the airbag 13 near the lower side 13b from the mounting piece 42 is housed between the roof panel 23 and the roof headlining 24 so that the non-folded portion 13h and the spiral portion 13f are successively inflated and deployed toward the rear door 26. The non-folded portion 13h of the airbag 13 is in the state in which it is deployed in the space between the roof panel 23 and the roof headlining 24. The airbag 13 is housed to extend in the width direction of the vehicle 20 in the space. Further, the airbag 13 is housed in the space in the state in which the both end portions 13e in the second direction are bent along the opposing surface of the roof panel 23 and the roof headlining 24.

This embodiment obtains the same advantages as the advantages described in (3) and (4) in the embodiment shown in FIGS. 1 to 7.

A third embodiment of the present invention will now be described with reference to FIGS. 10 and 11. The differences from the embodiments of FIG. 1 to FIG. 8 will be mainly discussed using FIG. 8. In this embodiment, a folding method of the airbag 13 differs from the embodiment shown in FIGS. 1 to 7.

As shown in FIG. 8, the airbag 13 is folded in the spiral form so that the upper side 13a and the lower side 13b are close to each other to form the spiral portion 13f (first folding). Thereafter, as shown in FIG. 10, the both end portions 13e in the second direction are folded to the center portion in the second direction (second folding). In the second folding, the both end portions 13e are folded in the first deployment direction (the downward direction in FIG. 10) of the airbag 13. The part of the airbag 13 corresponding to the part between the connecting portion 41 and the spiral portion 13f is the non-folded portion 13h housed in the vehicle 20 in the deployed state. With this process steps, the airbag 13 is folded.

Figure 11:
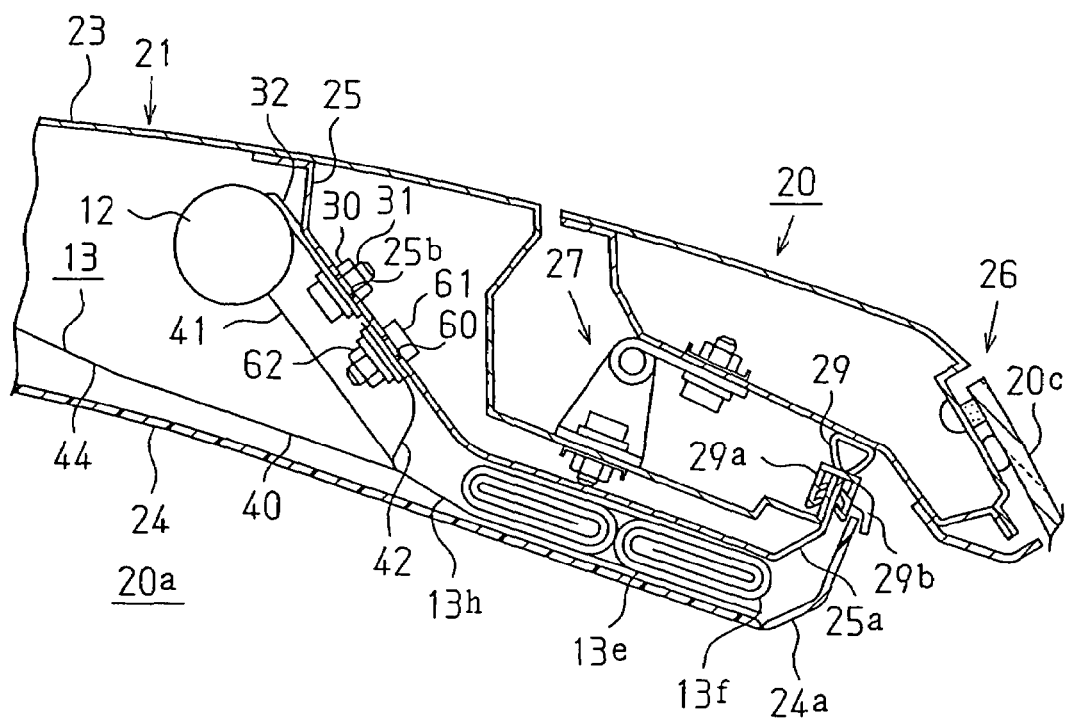
FIG. 11 is a cross-sectional view showing the rear part of the vehicle in which the airbag is housed.

The folded airbag 13 is housed in the space between the roof panel 23 and the roof headlining 24 of the vehicle 20 in the form as shown in FIG. 11.

As shown in FIG. 11, the non-folded portion 13h and the spiral portion 13f of the airbag 13 are housed between the roof panel 23 and the roof headlining 24 so that they are inflated and developed successively toward the rear door 26. In this embodiment, the non-folded portion 13h of the airbag 13 is in the state deployed in the space between the roof panel 23 and the roof headlining 24. The airbag 13 is housed in the space to extend in the width direction of the vehicle 20. Further, the airbag 13 is housed in the space in the state in which the both end portions 13e in the second direction are folded in the first direction (the direction toward the rear door 26) of the airbag 13. In other words, both end portions 13e are folded in a plane that includes the first and second directions.

This embodiment obtains the following advantages in addition to the advantages described in (1), (3) and (4) in the embodiment shown in FIGS. 1 to 7.

(5) On the occasion of the second folding of the airbag 13, both end portions 13e of the airbag 13 in the second direction are folded along the first direction.

As a result, the thickness of the folded airbag 13 is made small with respect to the height direction of the vehicle 20. Therefore, a large space for housing the airbag 13 is not required, and the distance between the opposing surfaces of the roof panel 23 and the roof headlining 24 at the part corresponding to the spiral portion 13f of the airbag 13 is made small inside the space between the roof panel 23 and the roof headlining 24. As a result, without sacrificing the distance between the head portion of an occupant seated on the rear seat 20b and the roof headlining 24, namely, the head clearance, the housing performance of the airbag 13 into the vehicle 20 is enhanced more.

(6) When the airbag 13 is inflated and deployed, the first cell 46a and the non-folded portion 13h are inflated first, and the both end portions 13e are inflated. On this occasion, the entire part of the roof headlining 24 at the rear side of the vehicle is pushed downward by the inflation of the first cell 46a, the non-folded portion 13h, and the both end portions 13e. As a result, an opening opened widely in the width direction of the vehicle 20 is formed in the portion at the rear side of the vehicle between the roof panel 23 and the roof headlining 24. Therefore, the airbag 13 is deployed uniformly over the entire part in the width direction of the vehicle 20 via the opening.

It should be apparent to those skilled in the art that the present invention may be embodied in many other specific forms without departing from the spirit or scope of the invention. Particularly, it should be understood that the invention may be embodied in the following forms.

In the embodiment of FIG. 17, the construction is not limited to the construction in which the both end portions 13*e* are folded along the sewn threads between the eighth cell 46*h* and the ninth cell 46*i*, and the tenth cell 46*j* and the eleventh cell 46*k* on the occasion of the first folding of the airbag 13. These both end portions 13*e* may be folded along the line parallel to the sewn threads, or the line intersecting the sewn threads, for example.

In the embodiment of FIGS. 1 to 7, the both end portions 13*e* may be folded to the side of the first surface 13*c* of the airbag 13 on the occasion of the first folding of the airbag 13.

In the embodiment of FIGS. 1 to 7, the airbag 13 may be folded in the spiral shape so that the spiral portion 13*f* formed on the side of the first surface 13*c* of the airbag 13 on the occasion of the second folding of the airbag 13.

In the embodiment of FIGS. 1 to 7, the part from the lower side 13*b* to the connecting portion 41 in the airbag 13 may be folded in to shape like a bellows shape after the first folding of the airbag 13.

In the embodiment of FIGS. 8 and 9, the airbag 13 is not limited to what forms the approximately trapezoidal shape in the state extended in the plane form. The airbag 13 may form, for example, an approximately square shape in the state extended in the plane form.

In the embodiment of FIGS. 8 and 9, the airbag 13 may be folded to provide the bellows portion 13*g* in FIG. 4(*c*) instead of providing the non-folded portion 13*h* between the connecting portion 41 and the spiral portion 13*f* when the airbag 13 is folded. The airbag 13 may be folded to provide both the bellows portion 13*g* and the non-folded portion 13*h* between the connecting portion 41 and the spiral portion 13*f*. The part corresponding to the portion between the connecting portion 41 of the airbag 13 and the lower side 13*b* may be folded in the spiral shape over the entire airbag 13 in the deployment direction without using the non-folded portion 13*h*.

Figure 10:
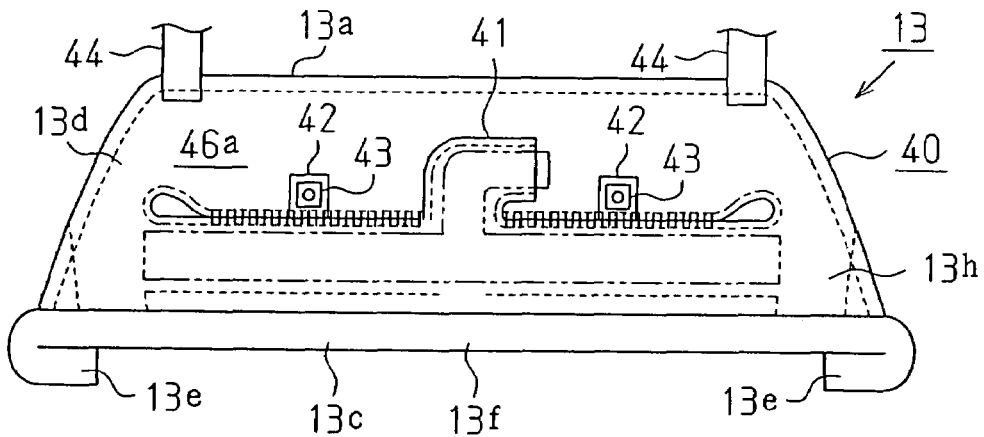
FIG. 10 is an explanatory view for explaining folding of an airbag according to a third embodiment of the present invention.

In the embodiment of FIGS. 10 and 11, when the airbag 13 is mounted to the vehicle 20 with the comparatively large distance between the head rest of the rear seat 20*b* and the roof headlining 24, for example, the both end portions 13*e* of the airbag 13 may be folded to the upper side or the lower side of the vehicle 20 at the time of the second folding of the airbag 13.

In each of the embodiments of FIG. 1 to FIG. 11, the sewing form of the fabric sheet 40, namely, the arrangement of the cells 46*a* to 46*k* is not limited to what is shown in FIGS. 3, 4(*a*) to 4(*c*), 8, and 9. The arrangement of the cells 46*a* to 46*k* is properly changeable in accordance with the size, shape and the like of the airbag 13, for example.

In each of the embodiments of FIGS. 1 to 11, the example of the airbag 13 in which the first cell 46*a* to the eleventh cell 46*k* are formed by sewing by using sewing thread onto the fabric sheet 40 is shown, but the airbag 13 may have other configurations. The present invention may use an airbag in which the first cell 46*a* to the eleventh cell 46*k* are formed by weaving of hollow weave of the fabric sheet 40, for example.

In each of the embodiments of FIGS. 1 to 11, a part of the airbag 13 may be housed between the body of the vehicle 20 and the rear pillar 66 (see FIG. 1).

In each of the embodiments of FIGS. 1 to 11, the airbag 13 may be deployed so as to cover at least a part of the surface of the rear pillar 66 of the vehicle 20 at the side of the passenger compartment 20*a*.

In each of the embodiments of FIGS. 1 to 11, the place provided with the inflator 12 may be optionally changed as long as gas from the inflator 12 is reliably supplied to the airbag 13.

In each of the embodiments of FIGS. 1 to 11, the airbag apparatus for rear-end collision may be mounted on the roof headlining 24 in the state in which the airbag apparatus is housed in the case openable when the airbag 13 is inflated and deployed, for example.

In each of the embodiments of FIGS. 1 to 11, a plurality of at least one of the inflators 12 and the airbags 13 may be provided, as long as the impact applied to the vehicle 20 from the rear is readily absorbed.

In each of the embodiments of FIGS. 1 to 11, the airbag 13 may be inflated by the output signal from the impact predicting sensor of the vehicle 20. In this case, the airbag 13 is inflated and deployed before the vehicle 20 collides, and therefore it restrains an occupant more reliably.

In each of the embodiments of FIGS. 1 to 11, the airbag 13 may be inflated and deployed along the inclination of the rear window glass 20*c* in the vehicle in which the rear window glass 20*c* is mounted in the inclined state.

In each of the embodiments of FIGS. 1 to 11, the present invention is embodied in a minivan or a hatchback, but the present invention may be embodied in a sedan.

The present examples and embodiments are to be considered as illustrative and not restrictive and the invention is not to be limited to the details given herein, but may be modified within the scope and equivalence of the appended claims.

The invention claimed is:

1. A method for inflating and deploying an airbag at a position rearward of a rearmost seat of a vehicle to protect an occupant seated on the rearmost seat, wherein the vehicle has a roof panel and a roof headlining covering an inner surface of the roof panel, wherein the airbag has a supply port through which gas is supplied and is in a state of being accommodated in the interior of the vehicle between the roof panel and the roof headlining while being folded in a state extending along a width direction of the vehicle, the supply port being located closer to one of the end portions of the airbag with respect to a deployment direction that intersects the width direction of the vehicle, wherein the airbag includes a first surface and a second surface, wherein, when the airbag is deployed, the first surface faces the seat and the second surface is located at a side opposite from the first surface, the method comprising:

in the accommodated state, folding the airbag in a spiral form onto the second surface such that the spirally folded portion is located apart from the supply port by a predetermined distance, wherein a portion of the airbag between the supply port and the spirally folded portion forms an inflation portion capable of being inflated between the roof panel and the roof headlining;

inflating the inflation portion before the spirally folded portion is started to be unfolded, wherein the inflation portion, when inflated, presses the roof headlining to move away from the roof panel so that an opening directed to a rear window glass of the vehicle is formed between the roof headlining and the roof panel, and an angle of the roof headlining relative to the rear window glass is changed, the spirally folded portion does not press the roof headlining when the inflation portion is inflated to press the roof headlining; and unfolding the spirally folded portion through the opening to inflate and develop along the rear window glass.

2. The method according to claim 1, wherein the portion of the airbag between the supply port and the spirally folded portion is folded in a bellows form or is deployed without being folded.

3. An airbag apparatus for an occupant seated in a rearmost seat of a vehicle, wherein the vehicle has a roof panel, a roof headlining covering an inner surface of the roof panel, and an inner panel located between the roof panel and the roof headlining at a rear end portion of the vehicle, the airbag apparatus comprising:

an airbag that is accommodated in the interior of the vehicle between the inner panel and the roof headlining while being folded in a state extending along a width direction of the vehicle, wherein the airbag has a supply port through which gas is supplied, the supply port being located closer to one of the end portions of the airbag with respect to a deployment direction that intersects the width direction of the vehicle; and an inflator that supplies gas to the airbag through the supply port, thereby inflating and deploying the airbag, wherein the airbag includes a first surface and a second surface, wherein, when the airbag is deployed, the first surface faces the seat and the second surface is located at a side opposite from the first surface, wherein, in the accommodated state, the airbag is folded in a spiral form onto the second surface such that the spirally folded portion is located apart from the supply port by a predetermined distance, wherein a portion of the airbag between the supply port and the spirally folded portion forms an inflation portion capable of being inflated between the inner panel and the roof headlining before the spirally folded portion is unfolded, wherein the inflation portion, when inflated, presses the roof headlining to move away from the inner panel so that an opening directed to a rear window glass of the vehicle is formed between the roof headlining and the inner panel, and an angle of the roof headlining relative to the rear window glass is changed, wherein the inflator is located in the vicinity of a front end portion of the inner panel and at a position frontward of the spirally folded portion with respect to the front-rear direction of the vehicle.

4. The airbag apparatus according to claim 3, wherein the portion of the airbag between the supply port and the spirally folded portion is folded in a bellows form or is deployed without being folded.

5. An airbag apparatus for an occupant seated in a rearmost seat of a vehicle, wherein the vehicle has a roof panel, a roof headlining covering an inner surface of the roof panel, and an inner panel located between the roof panel and the roof headlining at a rear end portion of the vehicle, the airbag apparatus comprising:

an airbag that is accommodated in the interior of the vehicle between the inner panel and the roof headlining while being folded in a state extending along a width direction of the vehicle; and an inflator that supplies gas to the airbag, thereby inflating and deploying the airbag, wherein, in the accommodated state, the airbag is folded in a spiral form such that the spirally folded portion extends along the width direction of the vehicle between the inner panel and the roof headlining, and wherein, as viewed in the width direction, the size of the spirally folded portion in a first direction is smaller than that in a second direction perpendicular to the first direction, the first direction being a direction of the distance between the inner panel and the roof headlining, the second direction being substantially a front-rear direction of the vehicle, wherein the spirally folded portion has a front end with respect to the front-rear direction of the vehicle, and wherein the inflator is located in the vicinity of a front end portion of the inner panel and at a position frontward of the front end of the spirally folded portion with respect to the front-rear direction of the vehicle.

6. The airbag apparatus according to claim 5, wherein the spirally folded portion is substantially flat.

7. The airbag apparatus according to claim 5, wherein the inner panel includes a rear roof rail provided at a rear end portion of the inner panel, wherein, in the accommodated state of the airbag, the spirally folded portion is located between the roof headlining and the rear roof rail.

* * * * *